Dec. 20, 1966  S. MITTY ET AL  3,292,942
ONE-PIECE DROP FRONT DOUBLE SELF-HANDLE SHOPPING CART
Filed Nov. 12, 1964  3 Sheets-Sheet 1
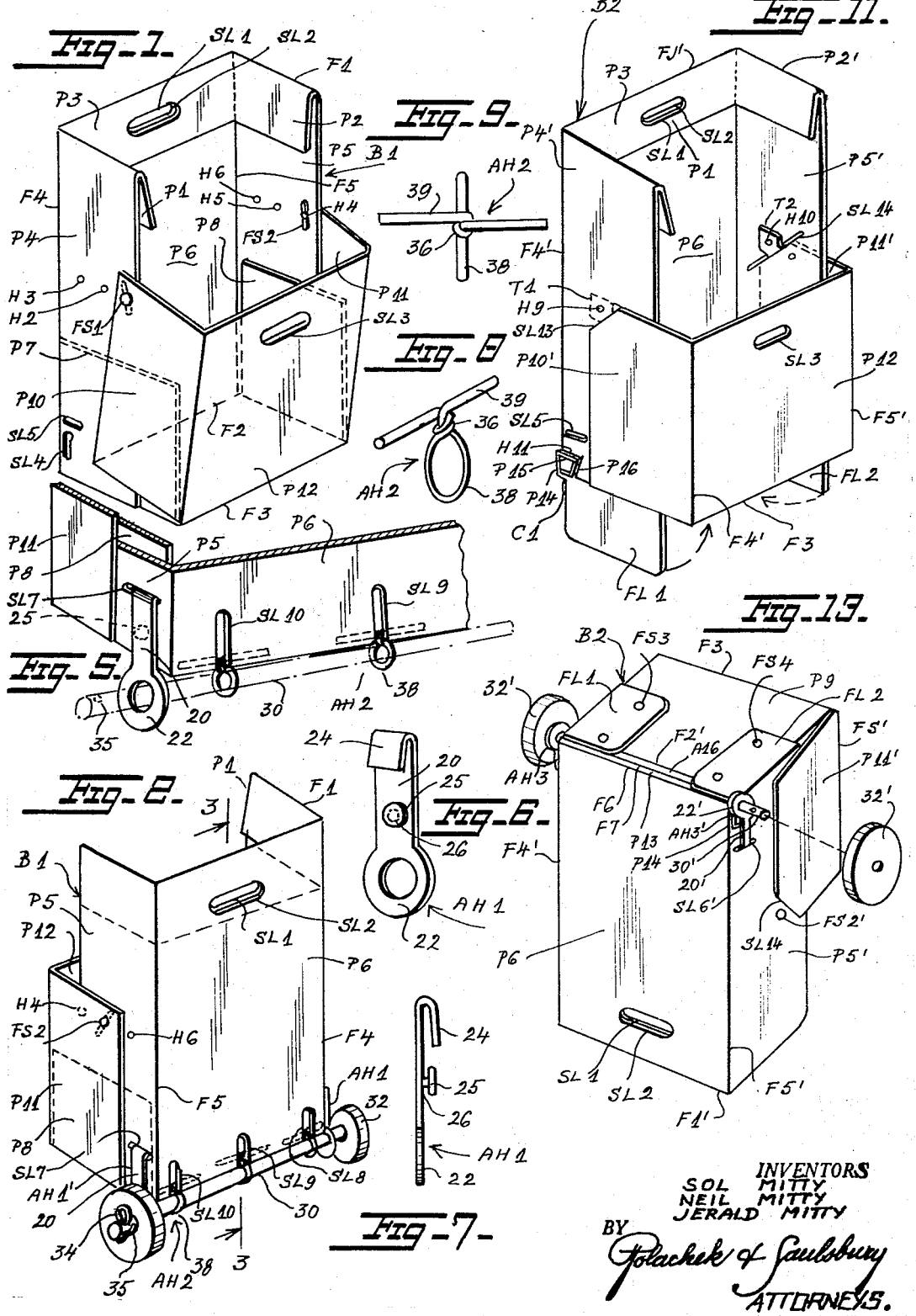
INVENTORS
SOL MITTY
NEIL MITTY
JERALD MITTY
BY Polachek & Saulsbury
ATTORNEYS

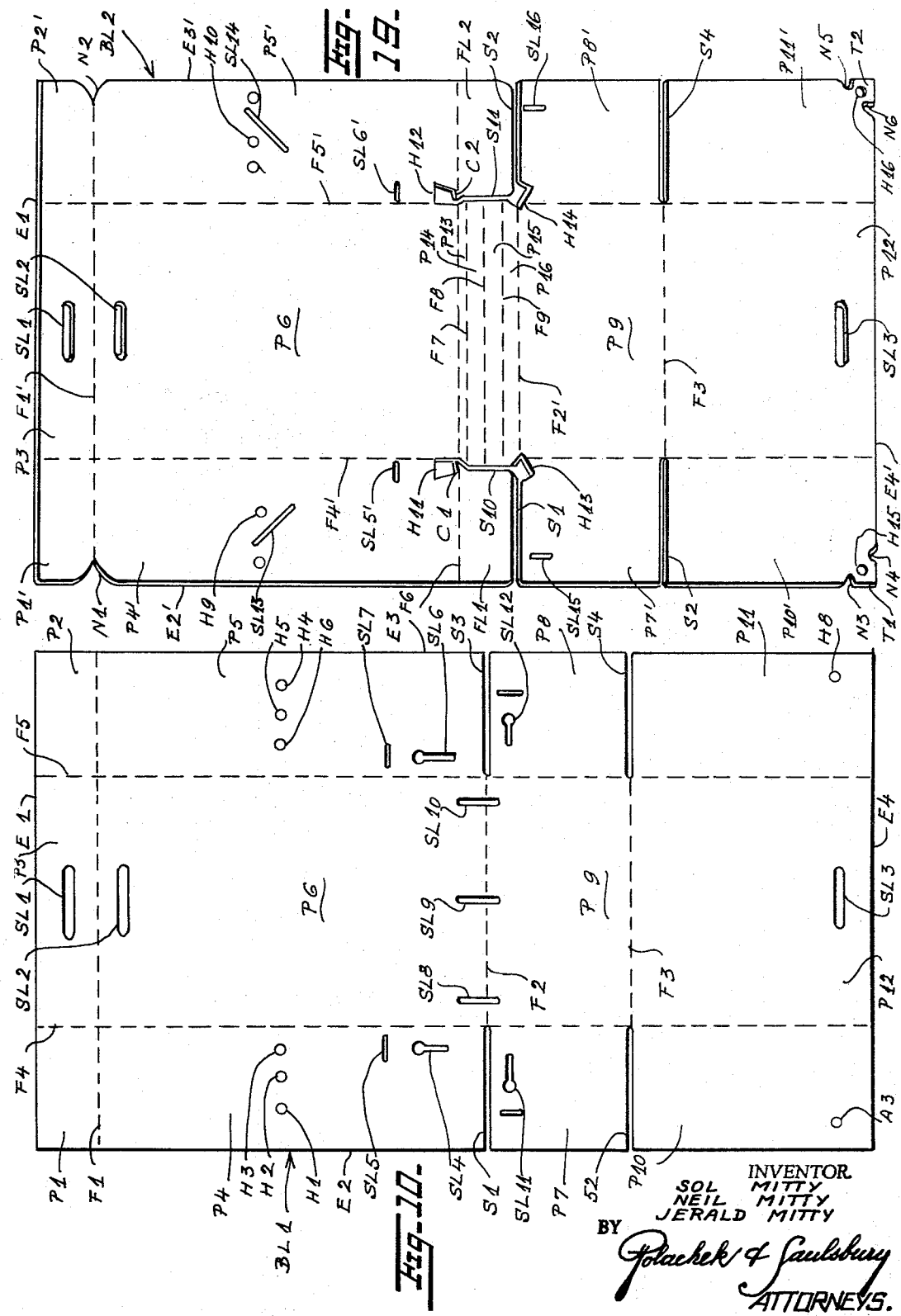

United States Patent Office 3,292,942
Patented Dec. 20, 1966

3,292,942
ONE-PIECE DROP FRONT DOUBLE SELF-
HANDLE SHOPPING CART
Sol Mitty, Neil Mitty, and Jerald Mitty, all of 144—45
78th Ave., Flushing, N.Y. 11375
Filed Nov. 12, 1964, Ser. No. 410,369
12 Claims. (Cl. 280—47.26)

This invention relates to the art of shopping carts and more particularly concerns a shopping cart having a body made from a single cut blank of laminated, corrugated paperboard or cardboard.

One object of the invention is to provide a shopping cart having a one-piece paperboard body which can be quickly set up from blank form quickly and easily.

A further object is to provide a shopping cart with a one-piece paperboard body having a drop front and handle of double thickness.

Another object is to provide a shopping cart with a body as described and with novel loop holders for supporting an axle to which wheels may be attached.

Still another object is to provide a novel cut cardboard blank which can be quickly set up to form a shopping cart body.

A further object is to provide a cardboard blank which can be quickly set up to form a shopping cart body.

A further object is to provide a cardboard blank for forming a shopping cart body, the blank being cut so as to minimize wastage of material.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of a set up shopping cart body with drop front in a forwardly extending position, FIG. 2 is a side and rear perspective view of a set up and assembled shopping cart according to the invention, with drop front in a second position, FIG. 3 is a cross sectional view taken on line 3—3 of FIG. 2, FIG. 4 is a vertical sectional view taken on line 4—4 of FIG. 3, FIG. 5 is an enlarged perspective view of part of a shopping cart body in set up condition with axle holders shown set in position, FIG. 6 is an enlarged perspective view of one axle holder, FIG. 7 is an edgewise elevational view of the axle holder of FIG. 6, FIG. 8 is a perspective view of another axle holder, FIG. 9 is a top plan view of the axle holder of FIG. 8, FIG. 10 is a plan view of a cardboard blank employed in setting up the shopping cart body of FIGS. 1–5, FIG. 11 is a perspective view of another shopping cart body, shown in partially set up condition, FIG. 12 is a side view of the shopping cart body of FIG. 11, shown set up, FIG. 13 is a perspective view of the cart body of FIG. 11, shown set up and in an inverted position, with axle holders, axle and wheels, FIG. 14 is a front elevational view of an assembled shopping cart employing the body of FIGS. 11–13, FIG. 15 is a fragmentary sectional view taken on line 15—15 of FIG. 14, FIG. 16 is a sectional view taken on line 16—16 of FIG. 15, FIG. 17 is a perspective view of another axle holder, FIG. 18 is an edgewise elevational view of the axle holder of FIG. 17, and FIG. 19 is an oblique plan view of a cardboard blank employed in setting up the shopping cart body of FIGS. 11–16.

Referring first to FIG. 10, there is shown blank BL1 which is set up to form a one-piece shopping cart body B1 to be described in connection with FIGS. 1–9. The blank BL2 is made from a rectangular piece of cardboard or laminated corrugated paperboard. The blank has a first slot SL1 formed near and parallel to its upper edge E1. Adjacent to slot SL1 and parallel to it is another slot SL2 identical in size and shape to slot SL1. Two parallel spaced slits S1, S2 extend inwardly from left edge E2 of the blank. These slits are aligned with slits S3, S4 extending inwardly from right edge E3, parallel to each other. A slot SL3 is formed near bottom edge E4 parallel to this edge. The slots S1, SL2 and SL3 are located on the medial longitudinal line of symmetry of the blank.

Creases are provided in the blank to serve as guides in folding the blank to form panels. The blank has a transverse crease F1 located between slots SL1, SL2 parallel to edges E1, E3. A second transverse crease F2 is aligned with slits S1, S3 and terminates at inner ends of these slits. A third transverse crease F3 is aligned with slits S2, S4 and terminates at inner ends of these slits. A left longitudinal crease F4 extends from top to bottom edges E1, E4 intersecting left ends of creases F1, F2 and F3 and inner ends of slits S1, S12. A right longitudinal crease F5 extends from top to bottom edges and intersects right ends of creases F1, F2, F3 and inner ends of slits SL3, SL4.

The creases F1, F4, F5 define two small rectangular corner panels P1, P2 at the upper edge of the blank, with a longer rectangular panel P3 between the two panels and having a width equal to panels P1, P2. A left, long, rectangular panel P4 is defined by edge E2, crease F1, crease F4 and slit S1. A right, long rectangular panel P5 is defined by right edge E3, slit S3, crease F5 and crease F1.

Between panels P4 and P5 is a large rectangular panel P6 defined by creases F1, F4, F5 and F2. This panel is located below panel P3. An intermediate small panel P7 almost square in shape is defined by left edge E2, slit S2, crease F4 and slit S2. Another similar small, almost square panel P8 is defined by right edge E3, slit S4, crease F5 and slit S3. Between these panels P7 and P8 is a rectangular panel P9 defined by creases F2, F3, F4, F5.

Below left, intermediate panel P7 is a longer rectangular end panel P10 defined by slit S2, crease F4, and edges E2, E4. A similar right, end panel P11 is located below panel P8 and is defined by slit S4, edge E3, edge E4 and crease F5. Between the left and right panels P10, P11 is a central, large end panel P12 defined by bottom edge E4, and creases F3, F4 and F5. Panels P1, P4, P7, P10 and P2, P5, P8, P11 at the left and right all have equal width transversely of the blank. Central panels P3, P6, P9, P12 all have equal width.

In upper left panel P4 are three transversely aligned spaced holes H1, H2, H3 aligned with similar spaced holes H4, H5 and H6 in panel P5. At the lower right corner of panel P4 is an elongated keyhole shaped slot SL4 with a short, narrow slot SL5 above it. At the lower left corner of panel P5 is an elongated keyhole shaped slot SL6 with a short narrow slot SL7 above it. These slots engage axle holders or hangers as will be described below. Three longitudinally extending slots SL8, SL9, SL10 spaced apart transversely of the blank extend across crease F2 with longer parts of the slots at the bottom end of panel P6 and shorter parts of the slots at the upper end of panel P9. Near the upper right corner of panel P7 is a transversely extending keyhole slot SL11. Another keyhole slot SL12 extends transversely near the upper left corner of panel P8. A hole H7 is located near the lower left corner of panel P10, and another hole H8 is located near the lower right corner of panel P11.

It will be noted that the holes, slots, slits, creases and panels are all symmetrically disposed in the blank BL1. The manner in which this blank is set up to form the shopping cart body B1 of FIGS. 1–7 will now be described. As shown in these figures, panel P12 forms a drop front which can be selectively disposed in a forwardly inclined position as shown in FIG. 1, upright as shown in FIG. 2 or inclined rearwardly as indicated by dotted lines in FIG. 3. This arrangement is effected by inserting fasteners FS1 and FS2 in corner holes H7, H8 of side panels P10, P11 and selected ones of holes H1–H3 and H4–H6, in side panels P4, P5. The blank is turned down on crease F1 and inwardly on creases F4, F5. This locates panels P1, P2, and P3 inwardly of panels P4, P5 and P6 and forms a double layer handle, since slots SL1 and SL2 register with each other and can be grasped at the top of the cart body.

Panels P7 and P8 fold up on creases F4, F5 and are located inside the cart body against inner sides of panels P4, P5 respectively. Panel P6 defines the back which is located at the back of the cart body. Panel P9 forms the bottom of the cart. Keyhole slots SL4 and SL11 register with each other. Keyhole slots SL6 and SL12 register with each other.

Axle holders or hangers AH1, AH1' best shown in FIGS. 6 and 7, are provided for engagement with the registering keyhole slots. Each of these holders has a straight flat shank 20 terminating at its lower end in a loop or eye 22. At its upper end the shank is turned down to form a hook 24. A knob or head 25 is secured by neck 26 to an intermediate point on shank 20. The hook 24 of one holder AH1 engages in slot SL5 while the head 25 fits through registering keyhole slots SL4, SL11. The hook 24 of a second holder AH1' engages in slot SL7 while the head of the holder engages in registering keyhole slots SL6, SL12. This anchors the holders AH1 and AH1' securely at the bottom of the cart body with the loops or eyes 22 depending below the bottom of the cart body to receive an axle rod 30. Ends of the axle rod extend outwardly of the eyes and receive wheels 32 which can be held on the axle by cotter pins 34 inserted in holes 35 near ends of the axle rod 30.

Three further axle hangers AH2 best shown in FIGS. 8 and 9 are provided for engaging the axle rod at points intermediate its ends. Each of these axle hangers is formed from a stiff piece of wire having a double helical twisted neck 36 extending radially from a circular eye or loop 38. The two ends 39 of the wire are disposed in substantial alignment in a plane perpendicular to the plane of eye 38. The ends 39 of the axle holder are inserted through any one of slots SL8, SL9, SL10 with the twisted neck 36 extending through the lower end of the slot in bottom panel P9. The holder ends are engaged on the upper side of the bottom panel and the eye 38 of the holder extends below the bottom panel centrally aligned with eyes 22 of axle holders AH1 and AH1'. As clearly shown in FIGS. 2 and 3, three axle hangers AH2 are securely held in the cart body and securely engage the axle rod 30.

The cart body B1 is very quickly set up and requires no special tools. The axle hangers are quickly attached; axle rod 30 is inserted and wheels are mounted on the axle to complete the assembly of the cart. A stack of blanks BL1 can be provided to a retailer or storekeeper for instant setting up to form cart bodies. Minimum space is required for shipment and storage until the cart bodies are required to be set up. Assembly of the cart may be completed on the premises of the storekeeper. At that time the desired position of the drop front panels P10, P11, P12 will be determined, although this can be changed by relocating fasteners FS1, FS2 in other holes in panels P4, P5.

Cart body B2 shown in FIGS. 11–16 is set up from cardboard blank BL2 shown in FIG. 19 to which reference is now made. This rectangular blank has certain panels, slots, slits and creases corresponding to those of blank and identically numbered. Notches N1 and N2 are formed in opposite edges E2' and E3' of the blank at ends of transverse crease F1'. This defines rounded corners on panels P1', P2', P4' and P5'. Instead of holes H1–H6 in the side panels P4, P6, there are provided slanted slots SL13, SL14 in panels P4', P5' and adjacent to these slots are holes H9, H10.

Slots SL5', SL6' are provided in panels P4', P5' to receive hooks 24 of axle holders AH3 shown in FIGS. 17, 18, but the keyhole slots are omitted. Trapezoidal holes H11, H12 are formed at the intersections of longitudinal creases F4', F5' and transverse crease F6. Rather sharp corners C1, C2 are formed at bottom edges of these holes at upper ends of short longitudinal slits S10, S11. Lower ends of these slots terminate in further trapezoidal holes H13, H14. Lower ends of these slots terminate in further trapezoidal holes H13, H14. In side panels P7' and P8' are short longitudinal slots SL15, SL16 near their upper left and upper right corners respectively for registering with slots SL5', SL6'. Notches N3, N4 are formed near the lower end of edge E2' and left end of edge E4' to define a generally rectangular tongue T1 at the lower left corner of panel P10'. A similar tongue T2 is formed at the lower right corner of panel P11' by notches N5, N6. Holes H15, H16 are formed in these tongues respectively.

Flap FL1 is defined by crease F6, slit S10, slit S1 and edge E2'. A similar flap FL2 is defined by crease F6, slits S2, S11 and edge E3'. Between transverse creases F6 and F2' are three transverse parallel creases F7, F8, F9 defining narrow panels P13, P14, P15 and P16. Slit S10 joins slit S1. Slit S11 joins slit S2.

The blank BL2 is set up to form cart body B2 as shown in FIGS. 11–16 to which reference is now made. The drop front of the cart body is formed by panels P10', P11' and P12. The drop front is held in place by insertion tongues T1, T2 through slots SL13, SL14. Holes H15, H16 in the tongues register with holes H9, H10 respectively and fasteners FS1', FS2' are inserted in the registering holes.

The folded panels P14, P15 and P16 define a triangular tubular structure held at one end by registering edges of trapezoidal holes H11, H13 and at the other end by registering edges of trapezoidal holes H12, H14. Axle rod 30' is inserted through the tubular panel structure and is engaged at opposite ends in loops 22' of axle holders AH3, AH3'. Wheels 32' are mounted on free ends of the axle rod 30'.

Axle holders AH3 and AH3' as best shown in FIGS. 17, 18 are similar to holders AH1 with a flat shank 20', flat eye 22' and bent hook 24'. The head 25 of holder AH1 is omitted. Hook 24' of axle holder AH3 is engaged in registering slots SL5', SL15'. The hook of axle holder AH3' is engaged in registering slots SL6', SL16.

Flaps FL1 and FL2 are secured to the bottom panel P9 by fasteners FS3, FS4. Rivets or staples can be used if desired. Panels P7' and P8' are located inside the cart body against side panels P4', P5' respectively. Outer side panels P10', P11' abut side panels P4', P5'. Panels P1', P2', P3 form a double thickness handle construction with holes SL1, SL12 in registration.

Narrow panel P13 abuts corners C1, C2 of flaps FL1, FL2. The panel as clearly shown in FIGS. 12 and 15 extends horizontally forwardly. Narrow panel P14 assumes an oblique position opposing obliquely disposed panel P16. The apex of the tubular construction holding axle rod 30' is faced down toward the bottom of the cart body.

It will be noted that both cart bodies B1 and B2 are formed from single blanks and employ simple fasteners with pliable legs. Rivets or staples may be used instead or the panels can be cemented together by a suitable adhesive if desired.

In high speed mass production of the blanks, conventional corrugated paperboard manufacturing machinery can be used, with a corrugated intermediate layer disposed between outer smooth facings and cemented together. The slits, slots, holes, notches and creases can all be formed by dies in the automatic board forming machinery. One blank after another can be cut free automatically from the continuously formed laminated structure at high speed. Thus the cart bodies can be made very economically, with very little waste material. The axle holders AH1 and AH3 can be made of metal, plastic or cardboard material at very low cost.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A shopping cart comprising a box-like body formed from a one-piece rectangular blank of sheet material, said body having a rectangular, vertical back panel, a first two rectangular side panels extending forwardly from opposite lateral edges respectively of the back panel, a bottom rectangular panel extending horizontally forwardly from the bottom edge of the back panel, a front panel folded upwardly from a forward edge of the bottom panel, a second two rectangular side panels folded rearwardly from lateral edges of the front panel and abutting the first two side panels on outer sides thereof, a third two side panels folded upwardly from lateral end edges of the bottom panel and abutting inner sides of the first two side panels, and flaps extending inwardly from bottom edges of the first two side panels, said flaps extending inwardly under the bottom panel.

2. A shopping cart comprising a box-like body formed from a one-piece rectangular blank of sheet material, said body having a rectangular, vertical back panel, a first two rectangular side panels extending forwardly from opposite lateral edges respectively of the back panel, a bottom rectangular panel extending horizontally forwardly from the bottom edge of the back panel, a front panel folded upwardly from a forward edge of the bottom panel, a second two rectangular side panels folded rearwardly from lateral edges of the front panel and abutting the first two side panels on outer sides thereof, a third two side panels folded upwardly from lateral end edges of the bottom panel and abutting inner sides of the first two side panels, and three other panels folded downwardly from upper edges of the first two side panels and back panel to form a double layer handle structure, said back panel and one of the three other panels having registering slots to provide a hand grip.

3. A shopping cart comprising a box-like body formed from a one-piece rectangular blank of sheet material, said body having a rectangular, vertical back panel, a first two rectangular side panels extending forwardly from opposite lateral edges respectively of the back panel, a bottom rectangular panel extending horizontally forwardly from the bottom edge of the back panel, a front panel folded upwardly from a forward edge of the bottom panel, a second two rectangular side panels folded rearwardly from lateral edges of the front panel and abutting the first two side panels on outer sides thereof, a third two side panels folded upwardly from lateral end edges of the bottom panel and abutting inner sides of the first two side panels, and three other panels folded downwardly from upper edges of the first two side panels and back panel to form a double layer handle structure, said back panel and one of the three other panels having registering slots to provide a hand grip, and flaps extending inwardly from bottom edges of the first two side panels, said flaps extending inwardly under the bottom panel.

4. A shopping cart comprising a box-like body formed from a one-piece rectangular blank of sheet material, said body having a rectangular, vertical back panel, a first two rectangular side panels extending forwardly from opposite lateral edges respectively of the back panel, a bottom rectangular panel extending horizontally forwardly from the bottom edge of the back panel, a front panel folded upwardly from a forward edge of the bottom panel, a second two rectangular side panels folded rearwardly from lateral edges of the front panel and abutting the first two side panels on outer sides thereof, a third two side panels folded upwardly from lateral end edges of the bottom panel and abutting inner sides of the first two side panels, and three other panels folded downwardly from upper edges of the first two side panels and back panel to form a double layer handle structure, said back panel and one of the three other panels having registering slots to provide a hand grip, said first two side panels each having a plurality of transversely spaced holes therein, and further holes near corners of the second two side panels for registration with selected ones of the holes in the first side panels to dispose the front panel at selected angles to the bottom panel and to receive fasteners for holding the front panel in the selected angular position.

5. A shopping cart comprising a box-like body formed from a one-piece rectangular blank of sheet material, said body having a rectangular, vertical back panel, a first two rectangular side panels extending forwardly from opposite lateral edges respectively of the back panel, a bottom rectangular panel extending horizontally forwardly from the bottom edge of the back panel, a front panel folded upwardly from a forward edge of the bottom panel, a second two rectangular side panels folded rearwardly from lateral edges of the front panel and abutting the first two side panels on outer sides thereof, a third two side panels folded upwardly from lateral end edges of the bottom panel and abutting inner sides of the first two side panels, and three other panels folded downwardly from upper edges of the first two side panels and back panel to form a double layer handle structure, said back panel and one of the three other panels having registering slots to provide a hand grip, and flaps extending inwardly from bottom edges of the first two side panels, said flaps extending inwardly under the bottom panel, the second two side panels having tongues formed at upper corners thereof, the first two side panels having slots formed obliquely therein to receive the tongues for holding the front panel parallel to the back panel and the third two panels against the first two side panels respectively.

6. A shopping cart comprising a box-like body formed from a one-piece rectangular blank of sheet material, said body having a rectangular, vertical back panel, a first two rectangular side panels extending forwardly from opposite lateral edges respectively of the back panel, a bottom rectangular panel extending horizontally forwardly from the bottom edge of the back panel, a front panel folded upwardly from a forward edge of the bottom panel, a second two rectangular side panels folded rearwardly from lateral edges of the front panel and abutting the first two side panels on outer sides thereof, a third two side panels folded upwardly from lateral end edges of the bottom panel and abutting inner sides of the first two side panels, and three other panels folded downwardly from upper edges of the first two side panels and back panel to form a double layer handle structure, said back panel and one of the three other panels having registering slots to provide a hand grip, the first two side panels having keyhole slots formed near lower edges thereof, with a transverse slot over each keyhole slot for engaging parts of an axle holder.

7. A shopping cart comprising a box-like body formed from a one-piece rectangular blank of sheet material, said body having a rectangular, vertical back panel, a first two rectangular side panels extending forwardly from opposite lateral edges respectively of the back panel, a bottom rectangular panel extending horizontally forwardly from the bottom edge of the back panel, a front panel folded upwardly from a forward edge of the bottom panel, a second two rectangular side panels folded rearwardly from lateral edges of the front panel and abutting the first two side panels on outer sides thereof, a third two side panels folded upwardly from lateral end edges of the bottom panel and abutting inner sides of the first two side panels, and three other panels folded downwardly from upper edges of the first two side panels and back panel to form a double layer handle structure, said back panel and one of the three other panels having registering slots to provide a hand grip, the first two side panels having keyhole slots formed near lower edges thereof with a transverse slot over each keyhole slot, and a pair of axle holders, each axle holder having a flat straight shank, a flat eye at one end of the shank to receive one end of an axle rod, a depending hook at the other end of the shank engaging in one of the transverse slots, and a head projecting from said shank engaging in a keyhole slot.

8. A shopping cart comprising a box-like body formed from a one-piece rectangular blank of sheet material, said body having a rectangular, vertical back panel, a first two rectangular side panels extending forwardly from opposite lateral edges respectively of the back panel, a bottom rectangular panel extending horizontally forwardly from the bottom edge of the back panel, a front panel folded upwardly from a forward edge of the bottom panel, a second two rectangular side panels folded rearwardly from lateral edges of the front panel and abutting the first two side panels on outer sides thereof, a third two side panels folded upwardly from lateral end edges of the bottom panel and abutting inner sides of the first two side panels, and three other panels folded downwardly from upper edges of the first two side panels and back panel to form a double layer handle structure, said back panel and one of the three other panels having registering slots to provide a hand grip, the first two side panels having keyhole slots formed near lower edges thereof, with a transverse slot over each keyhole slot for engaging parts of an axle holder, said back and bottom panels having transversely spaced slots for receiving parts of other axle holders therein.

9. A shopping cart comprising a box-like body formed from a one-piece rectangular blank of sheet material, said body having a rectangular, vertical back panel, a first two rectangular side panels extending forwardly from opposite lateral edges respectively of the back panel, a botttom rectangular panel extending horizontally forwardly from the bottom edge of the back panel, a front panel folded upwardly from a forward edge of the bottom panel, a second two rectangular side panels folded rearwardly from lateral edges of the front panel and abutting the first two side panels on outer sides thereof, a third two side panels folded upwardly from lateral end edges of the bottom panel and abutting inner sides of the first two side panels, and three other panels folded downwardly from upper edges of the first two side panels and back panel to form a double layer handle structure, said back panel and one of the three other panels having registering slots to provide a hand grip, the first two side panels having keyhole slots formed near lower edges thereof with a transverse slot over each keyhole slot, and a pair of axle holders, each axle holder having a flat straight shank, a flat eye at one end of the shank to receive one end of an axle rod, a depending hook at the other end of the shank engaging in one of the transverse slots, and a head projecting from said shank engaging in a keyhole slot, said back and bottom panels having transversely spaced further slots, and other axle holders, each of the other axle holders having a wire eye, a twisted wire neck extending radially from the wire eye and wire ends extending in substantial alignment from the wire neck in a plane perpendicular to the plane of the wire eye, the wire ends being engaged on the bottom panel with the wire necks extending through said further slots and with the wire eyes of the other axle holders disposed in central alignment with the eyes of the first named axle holders.

10. A shopping cart comprising a box-like body formed from a one-piece rectangular blank of sheet material, said body having a rectangular, vertical back panel, a first two rectangular side panels extending forwardly from opposite lateral edges respectively of the back panel, a bottom rectangular panel extending horizontally forwardly from the bottom edge of the back panel, a front panel folded upwardly from a forward edge of the bottom panel, a second two rectangular side panels folded rearwardly from lateral edges of the front panel and abutting the first two side panels on outer sides thereof, a third two side panels folded upwardly from lateral end edges of the bottom panel and abutting inner sides of the first two side panels, and three other panels folded downwardly from upper edges of the first two side panels and back panel to form a double layer handle structure, said back panel and one of the three other panels having registering slots to provide a hand grip, and flaps extending inwardly from bottom edges of the first two side panels, said flaps extending inwardly under the bottom panel, a plurality of narrow panels located between the lower edge of the back panel and rear edge of the bottom panel, said narrow panels being folded to form a triangular tubular structure for receiving an axle rod, said flaps having corners underlaying ends of the tubular structure, said first two panels and third two panels having holes formed therein and registering with each other to define supports for opposite ends of said tubular structure.

11. A shopping cart comprising a box-like body formed from a one-piece rectangular blank of sheet material, said body having a rectangular, vertical back panel, a first two rectangular side panels extending forwardly from opposite lateral edges respectively of the back panel, a bottom rectangular panel extending horizontally forwardly from the bottom edge of the back panel, a front panel folded upwardly from a forward edge of the bottom panel, a second two rectangular side panels folded rearwardly from lateral edges of the front panel and abutting the first two side panels on outer sides thereof, a third two side panels folded upwardly from lateral end edges of the bottom panel and abutting inner sides of the first two side panels, and three other panels folded downwardly from upper edges of the first two side panels and back panel to form a double layer handle structure, said back panel and one of the three other panels having registering slots to provide a hand grip, and flaps extending inwardly from bottom edges of the first two side panels, said flaps extending inwardly under the bottom panel, a plurality of narrow panels located between the lower edge of the back panel and rear edge of the bottom panel, said narrow panels being folded to form a triangular tubular structure for receiving an axle rod, said flaps having corners underlaying ends of the tubular structure, said first two panels and third two panels having holes formed therein and registering with each other to define supports for opposite ends of said tubular structure, said first two panels and third two panels having short slots registering with each other for receiving ends of axle holders.

12. A shopping cart comprising a box-like body formed from a one-piece rectangular blank of sheet material, said body having a rectangular, vertical back panel, a first two rectangular side panels extending forwardly from opposite lateral edges respectively of the back panel, a bottom rectangular panel extending horizontally forwardly from the bottom edge of the back panel, a front panel folded upwardly from a forward edge of the bottom panel, a second two rectangular side panels folded rearwardly from lateral edges of the front panel and abutting the first two side panels on outer sides thereof, a third two side panels folded upwardly from lateral end edges of the bottom panel and abutting inner sides of the first two side panels, and three other panels folded downwardly from upper edges of the first two side panels and back panel to form a double layer handle structure, said back panel and one of the three other panels having registering slots to provide a hand grip, and flaps extending inwardly from bottom edges of the first two side panels, said flaps extending inwardly under the bottom panel, a plurality of narrow panels located between the lower edge of the back panel and rear edge of the bottom panel, said narrow panels being folded to form a triangular tubular structure for receiving an axle rod, said flaps having corners underlaying ends of the tubular structure, said first two panels and third two panels having holes formed therein and registering with each other to define supports for opposite ends of said tubular structure, said first two panels and third two panels having short slots registering with each other on opposite sides of said body, and a pair of axle holders, each of said axle holders having a flat shank, a flat eye at one end to receive and engage one end of the axle rod, and a depending hook at the other end of the shank engaging in the registering short slots, so that the eyes of the axle holders are disposed in central alignment at opposite sides of the cart body.

References Cited by the Examiner

UNITED STATES PATENTS

| | | | |
|---|---|---|---|
| 2,489,034 | 11/1949 | James | 229—52 |
| 2,597,294 | 5/1952 | Connor | 280—47.26 |
| 2,957,615 | 10/1960 | Karr et al. | 229—16 |
| 3,012,703 | 12/1961 | Gander | 229—16 |
| 3,087,740 | 4/1963 | Mitty et al. | 280—47.26 |
| 3,092,395 | 6/1963 | Mitty et al. | |
| 3,135,527 | 6/1964 | Knapp | 280—47.26 X |

BENJAMIN HERSH, *Primary Examiner.*

J. A. PEKAR, *Assistant Examiner.*